(12) United States Patent
Fukuda et al.

(10) Patent No.: US 6,434,971 B2
(45) Date of Patent: Aug. 20, 2002

(54) EXPANSION VALVE

(75) Inventors: Eiji Fukuda; Kazuhiko Watanabe, both of Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 09/793,608

(22) Filed: Feb. 27, 2001

(30) Foreign Application Priority Data

Mar. 2, 2000 (JP) ........................................ 2000-056755

(51) Int. Cl.[7] ................................................. F25B 39/02
(52) U.S. Cl. .......................... 62/504; 62/225; 236/92 B
(58) Field of Search ................... 62/225, 504; 236/92 B

(56) References Cited

U.S. PATENT DOCUMENTS

| | | | |
|---|---|---|---|
| 4,065,939 A | * 1/1978 | Thornbery et al. | 236/92 B |
| 4,362,027 A | * 12/1982 | Barbier | 236/92 B |
| 4,542,852 A | 9/1985 | Orth | |
| 4,984,735 A | * 1/1991 | Glennon et al. | 236/92 B |
| 5,297,728 A | * 3/1994 | Yano et al. | 236/92 B |
| 5,361,597 A | * 11/1994 | Hazime et al. | 62/225 |
| 5,467,611 A | * 11/1995 | Cummings et al. | 62/299 |
| 6,241,157 B1 | * 6/2001 | Yano et al. | 236/92 B |

FOREIGN PATENT DOCUMENTS

| | | |
|---|---|---|
| EP | 0691517 A1 | 1/1996 |
| EP | 0762063 A1 | 3/1997 |
| EP | 0943878 A2 | 9/1999 |
| FR | 2757613 | 12/1996 |

* cited by examiner

Primary Examiner—William E. Tapolcai
Assistant Examiner—Mohammad M Ali
(74) Attorney, Agent, or Firm—Rader, Fishman & Grauer, PLLC

(57) ABSTRACT

An expansion valve 1 comprises a prism-shaped body 10, and a valve chamber 20 is formed within the body 10. Refrigerant supplied from a compressor flows into the valve chamber through a passage 22, passes between a valve means 42 and a valve seat 23, and travels toward an evaporator through a passage 24. Refrigerant returning from the evaporator enters the body 10 through a passage 26, and after the refrigerant temperature information is transmitted to the operating shaft 40, the refrigerant flows out through a passage 28 toward the compressor. Passages 22 and 28 open to a first side surface of the body, and passages 24 and 26 open to a second side surface orthogonal to the first surface. Such structure improves the degree of freedom for mounting the expansion valve 1.

4 Claims, 8 Drawing Sheets

A-A

B-B

EXPANSION VALVE

FIELD OF THE INVENTION

The present invention relates to an expansion valve for controlling the flow rate of the refrigerant equipped to the refrigeration cycle of an air conditioning device for a vehicle and the like.

DESCRIPTION OF THE RELATED ART

A known expansion valve comprises a prism-shaped valve body, the body being equipped with a valve chamber and a power element for operating a valve means formed within the valve chamber.

This kind of expansion valve comprises two passages communicated to the valve chamber, and a passage through which the refrigerant returning from the evaporator to the compressor travels. An operating shaft capable of communicating the movement of the power element to the valve means penetrates the passage through which the refrigerant returning from the evaporator to the compressor travels, and transmits the temperature information of the refrigerant to the power element.

The structure of such conventional expansion valve is shown in FIG. 9 and FIG. 10. FIG. 9 is a schematic view showing the external structure of the expansion valve, and FIG. 10 is a cross-sectional view showing the cross-section A–A' of FIG. 9 observed from the direction of the arrow. In FIGS. 9 and 10, the valve body 30 is equipped with a first passage 32 formed from the refrigerant exit of a condenser 5 via a receiver 6 to the refrigerant entrance of an evaporator 8, and a second passage 34 formed between the refrigerant exit of the evaporator 8 and the refrigerant entrance of a compressor 4, the two passages separately positioned one above the other. The passages constitute a refrigerant piping 11 of the refrigeration cycle. The first passage 32 is equipped with a valve hole 23 for performing adiabatic expansion of the liquid-phase refrigerant supplied from the refrigerant exit of the receiver 6 through the opening 321. The center line of the valve hole 23 is positioned along the longitudinal direction of the valve body 30. A valve seat is formed to the entrance of the valve hole 23, toward which a ball-shaped valve means 42 is biased by a spring 32 such as a compression coil spring via a valve support member 31.

The first passage 32 to which the liquid-phase refrigerant from receiver 6 enters functions as a liquid-phase refrigerant passage, equipped with an exit port 322, an entrance port 321, and a valve chamber 20 communicated to the entrance port 321. After expansion, the refrigerant flows out through the exit port 322 to the evaporator 8. The valve chamber 20 is a chamber with a bottom formed coaxial to the center line of the valve hole 23, which is sealed by a plug 34. A sealing member 36 is equipped to the plug 34.

A power element 50 for driving the valve member 42 is equipped to the upper end of the valve body 30. The power element 50 comprises a case 56, the interior space of which is divided by a diaphragm 54 into upper and lower pressure chambers. The lower pressure chamber 55 is communicated to the second passage 34 through a pressure equalizing hole 36e formed coaxial to the center line of the valve hole 32a.

The second passage 34 comprises an entrance port 342 and an exit port 341, where refrigerant vapor exiting the refrigerant exit of the evaporator 8 flows in through the entrance port 342 and exits through the exit port 341 toward the compressor 4. Passage 34 functions as a passage for the gas-phase refrigerant, and the pressure of the refrigerant vapor is loaded to the lower pressure chamber 55, via the pressure equalizing hole 36e. An operating shaft 40 extending from the lower surface of the diaphragm 54 to the valve hole 23 of the first passage 32 is coaxially positioned within the pressure equalizing hole 36e. A stopper 52 is equipped to the operating shaft 40, which is placed within the lower pressure chamber 55, and contacted to the lower surface of the diaphragm 54. The operating shaft 40 is supported by the inner surface of the lower pressure chamber 55 constituting the power element 50 and the separation wall between the first passage 32 and the second passage 34 of the valve body 30 so as to slide freely in the vertical direction. The lower end of the operating shaft 40 is contacted to the valve means 42. A sealing member 44 that prevents refrigerant from leaking between the first passage 32 and the second passage 34 is equipped to the peripheral surface of the operating shaft 40 corresponding to the operating shaft slide-guide hole in the separation wall.

A known heat sensing gas for driving the diaphragm is filled in the upper pressure chamber 55. The heat of the refrigerant vapor exiting through the refrigerant exit of the evaporator 8 and traveling in the second passage 34 is transmitted to the diaphragm drive fluid through the diaphragm 54 and the valve means drive shaft 36f exposed to the second passage 34 and the pressure equalizing hole 36e communicated to the second passage 34. Further, reference number 58 shows a plug body for sealing the heat sensing gas.

The heat sensing gas inside the upper pressure chamber 55 loads the pressure corresponding to the heat transmitted thereto to the upper surface of the diaphragm 54. The diaphragm 54 is vertically displaced corresponding to the difference in the pressure between the diaphragm drive gas loaded to the upper surface thereof and the pressure loaded to the lower surface of the diaphragm 54. The vertical displacement of the diaphragm 54 drives the valve means 42 via the operation shaft 40 closer to or away from the valve seat of the valve hole 23. As a result, the flow rate of the refrigerant is controlled.

According to the above-mentioned conventional expansion valve, the valve means drive shaft 36f is positioned at the center of the valve body 30, so the power element 36 must also be positioned at the center area of the valve body 30.

SUMMARY OF THE INVENTION

Since according to the prior-art expansion valve, the pipes to which the evaporator and the compressor are connected are arranged in opposing directions, which restrict the degree of freedom when determining the mounting position of the expansion valve, the evaporator, and the compressor. Especially, when the expansion valve must be mounted in the engine room of a vehicle and the like where mounting space is limited, the mounting structure of the expansion valve becomes a problem.

The object of the present invention is to solve such problem by providing an expansion valve having an improved degree of freedom of the mounting structure.

In order to achieve the above object, the present invention provides an expansion valve for controlling the flow rate of a refrigerant provided from a compressor to an evaporator, the valve comprising a prism-shaped valve body, a passage through which the refrigerant exiting from the compressor travels, a passage through which the refrigerant returning to the compressor travels, the passages opening to a first side surface of the valve body, and a passage through which the refrigerant flowing toward the evaporator travels, a passage through which the refrigerant returning from the evaporator travels, the passages opening to a second side surface of the valve body adjacent to the first side surface equipped with the openings for the two former-mentioned passages.

A preferable example of the expansion valve according to the present invention characterizes in that a power element is mounted at a biased position against the valve body.

Moreover, the expansion valve according to the present invention is equipped with a stud bolt equipped to the first side surface of the valve body utilized for fixing the expansion valve, and two penetrating holes penetrating through the second side surface and the side surface opposite to the second side surface utilized also for fixing.

The expansion valve according to the present invention having the above-explained structure includes refrigerant passages opening to the adjacent (neighboring) side surfaces of the valve body, which enables to improve the degree of freedom of the mounting structure. Moreover, since the mounting position of the power element is biased against the valve body, the interference that may exist between the stud bolt and the penetrating holes according to the conventional structure is prevented.

DETAILED DESCRIPTION OF PREFERRED EMBODIMENTS

Figure 1:
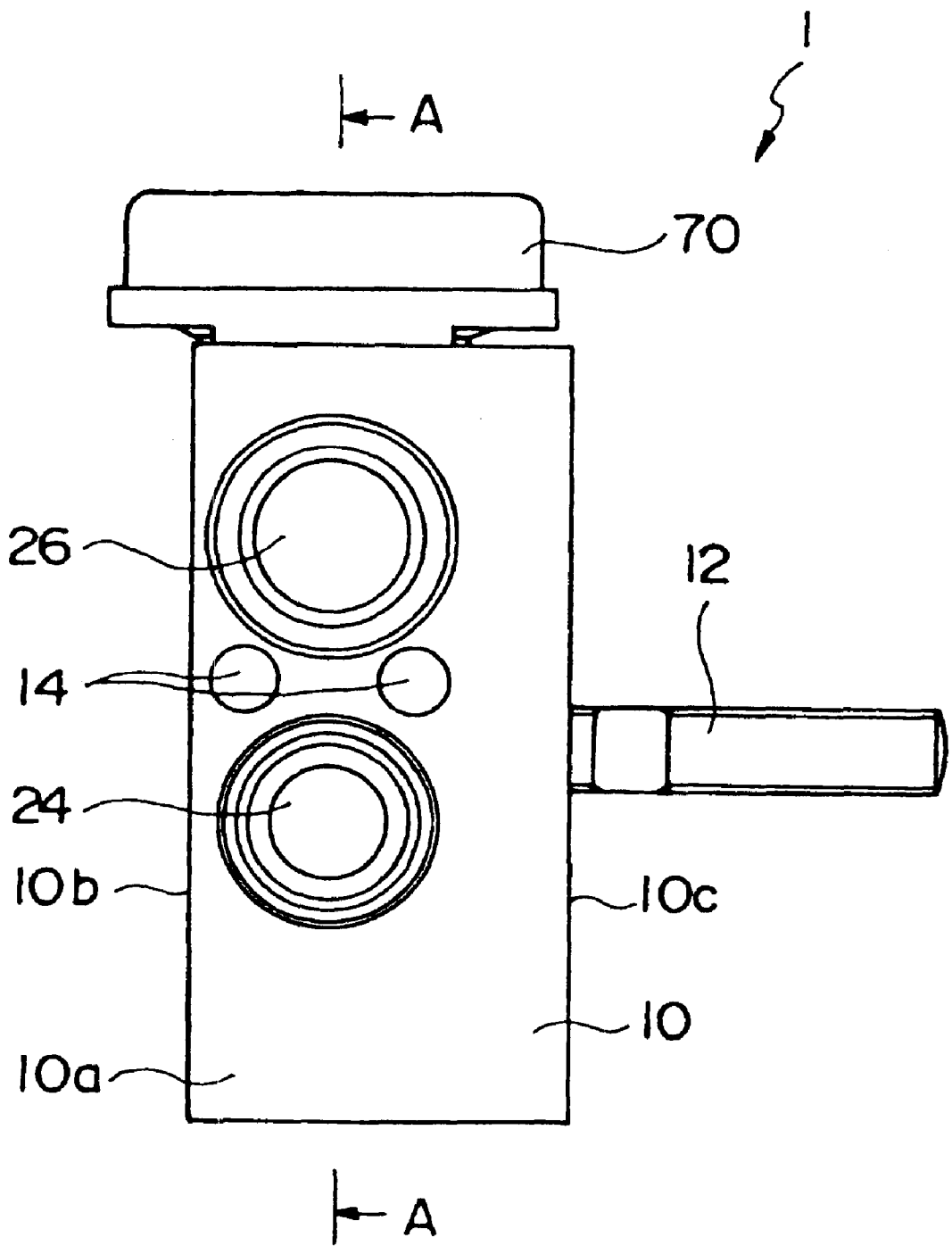
FIG. 1 is a front view of the expansion valve according to the present invention.
Figure 2:
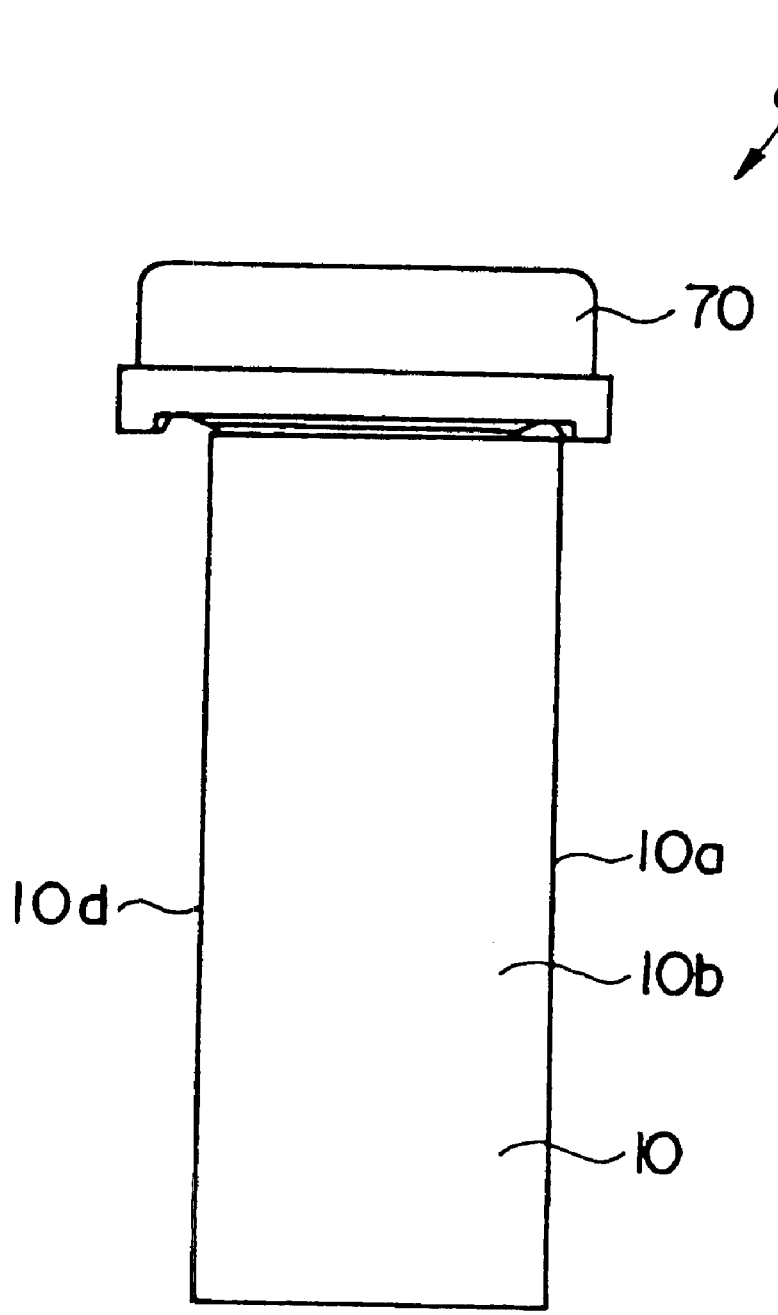
FIG. 2 is a left side view of the expansion valve according to the present invention.
Figure 3:
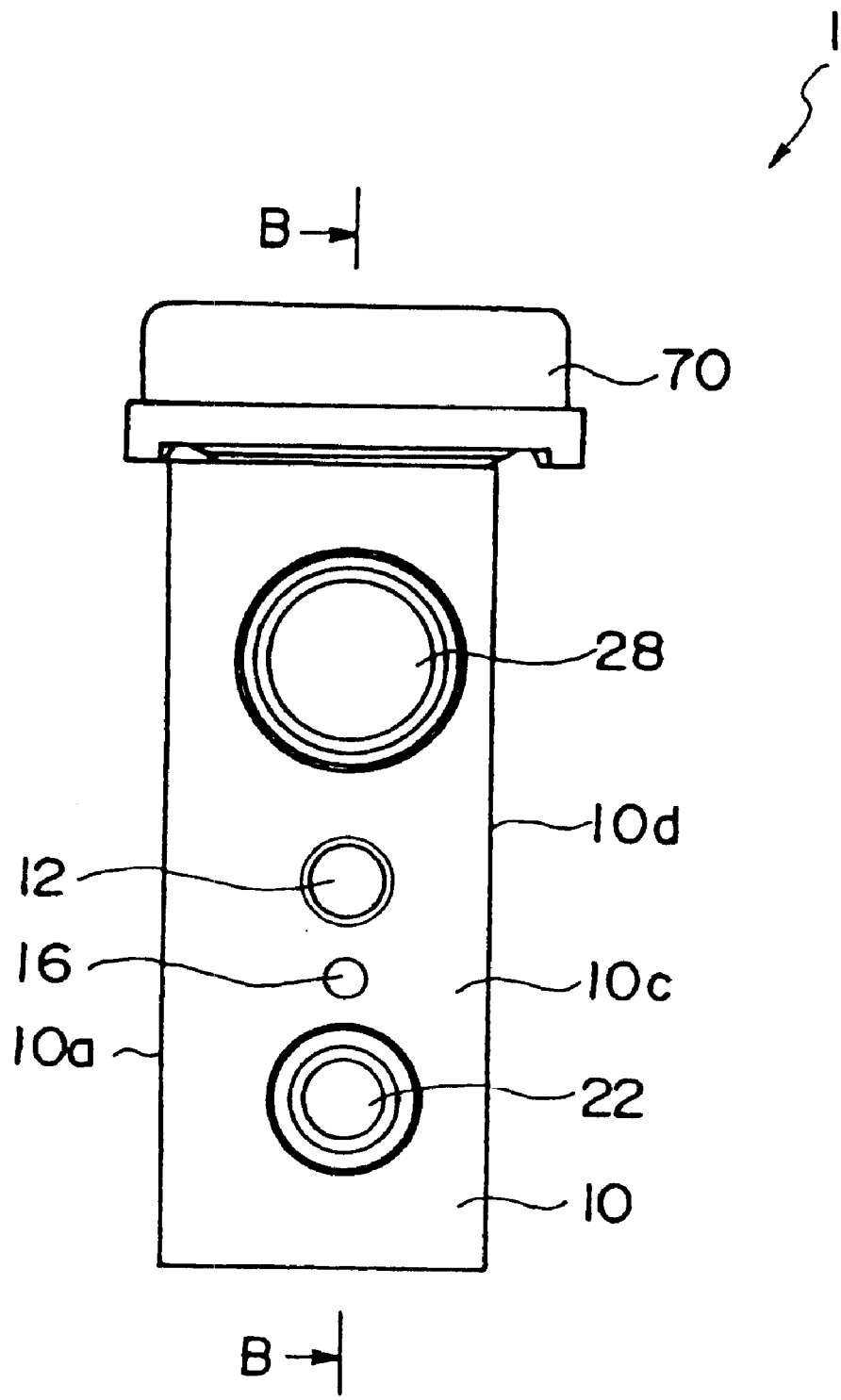
FIG. 3 is a right side view of the expansion valve according to the present invention.
Figure 4:
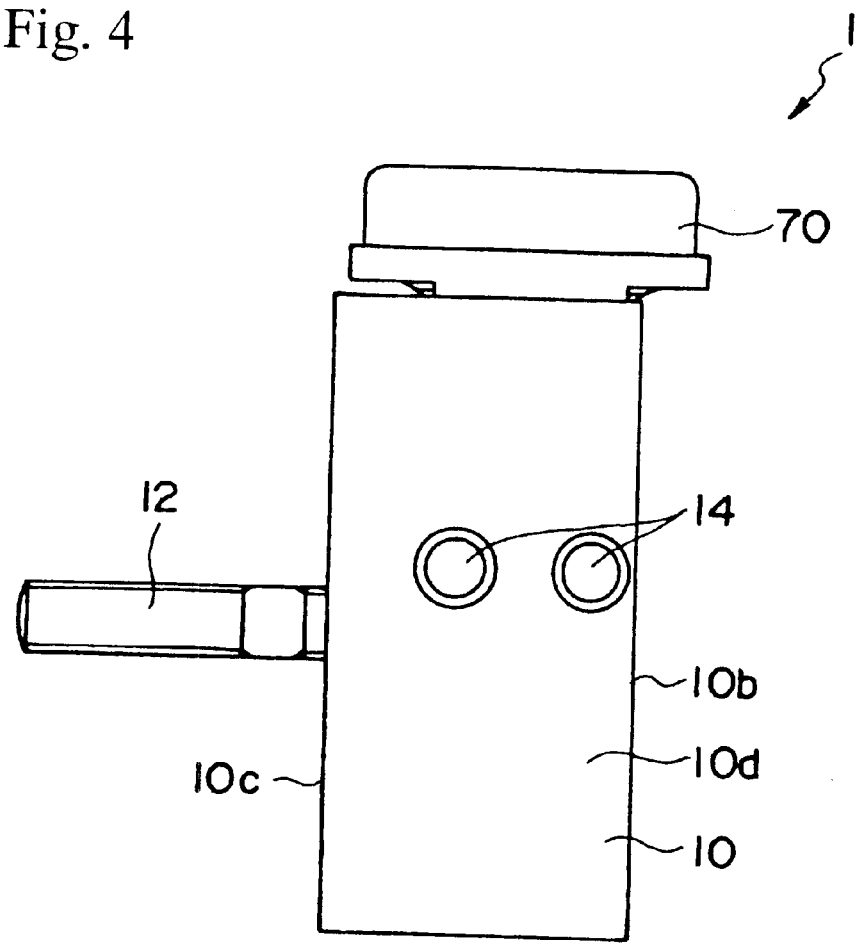
FIG. 4 is a back view of the expansion valve according to the present invention.
Figure 5:
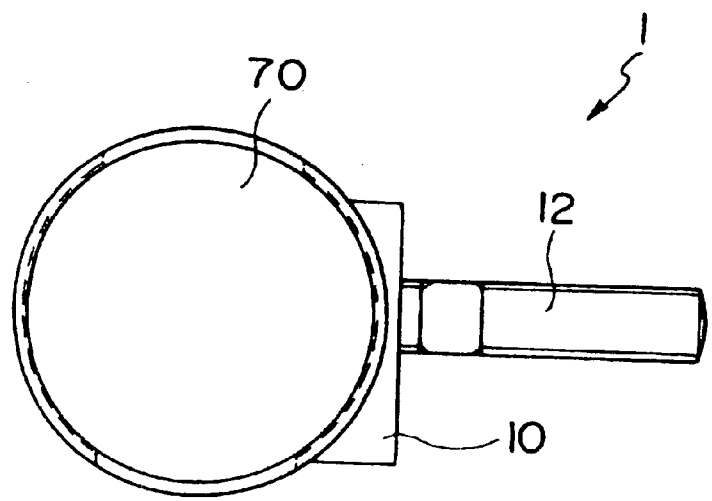
FIG. 5 is an upper view of the expansion valve according to the invention.
Figure 6:
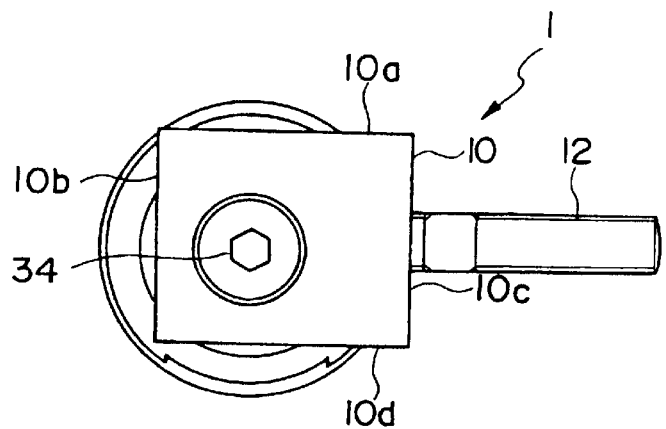
FIG. 6 is a bottom view of the expansion valve according to the invention.
Figure 7:
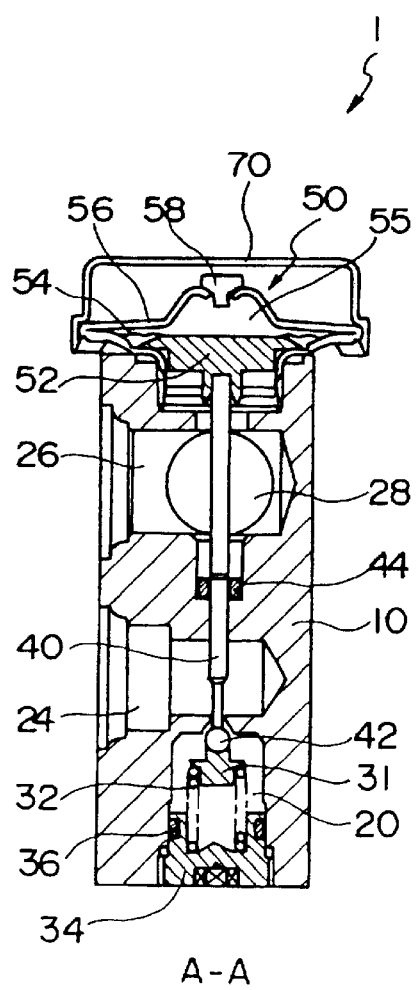
FIG. 7 is a cross-sectional view taken at line A—A of FIG. 1.
Figure 8:
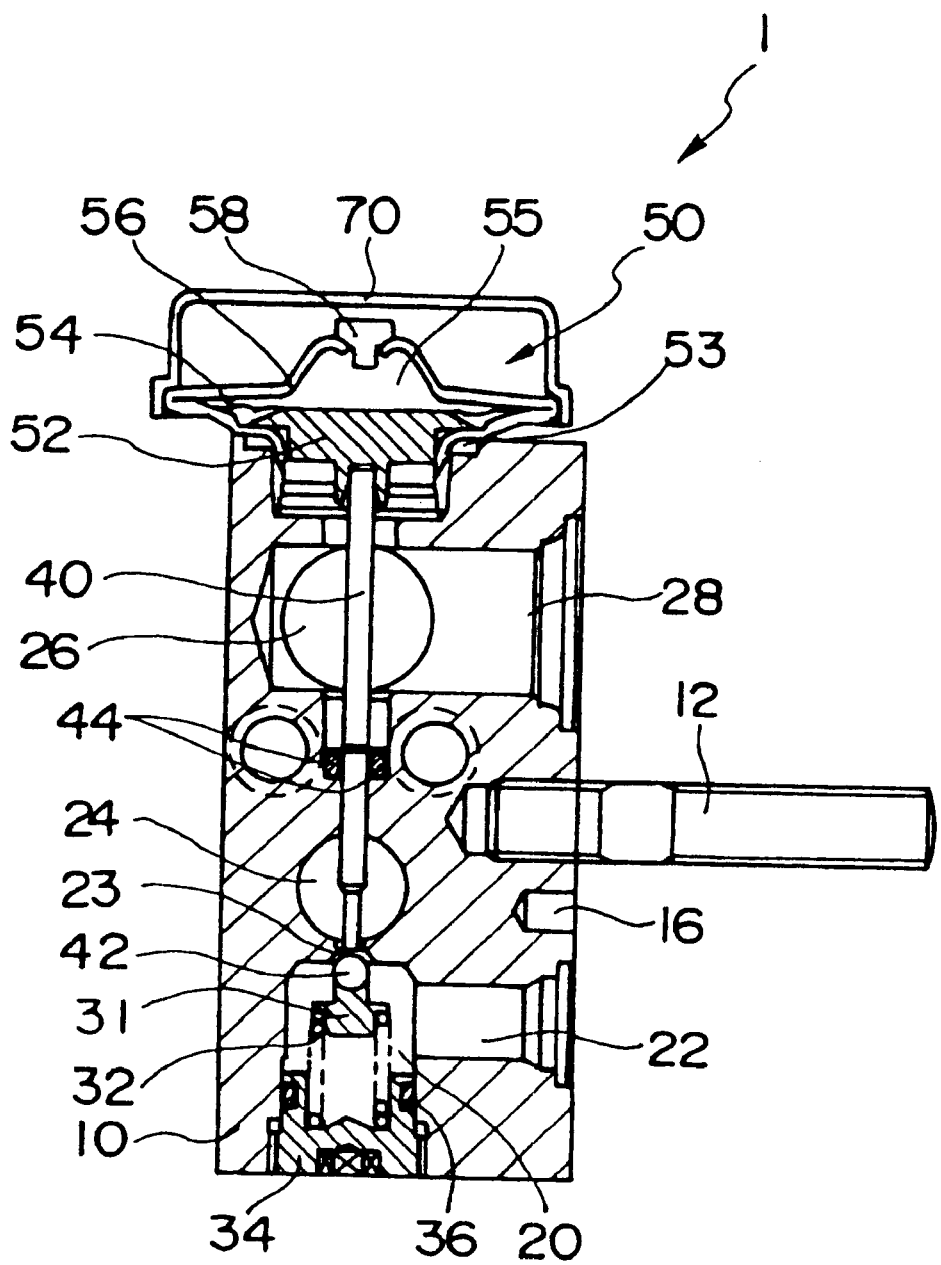
FIG. 8 is a cross-sectional view taken at line B—B of FIG. 3.
Figure 9:
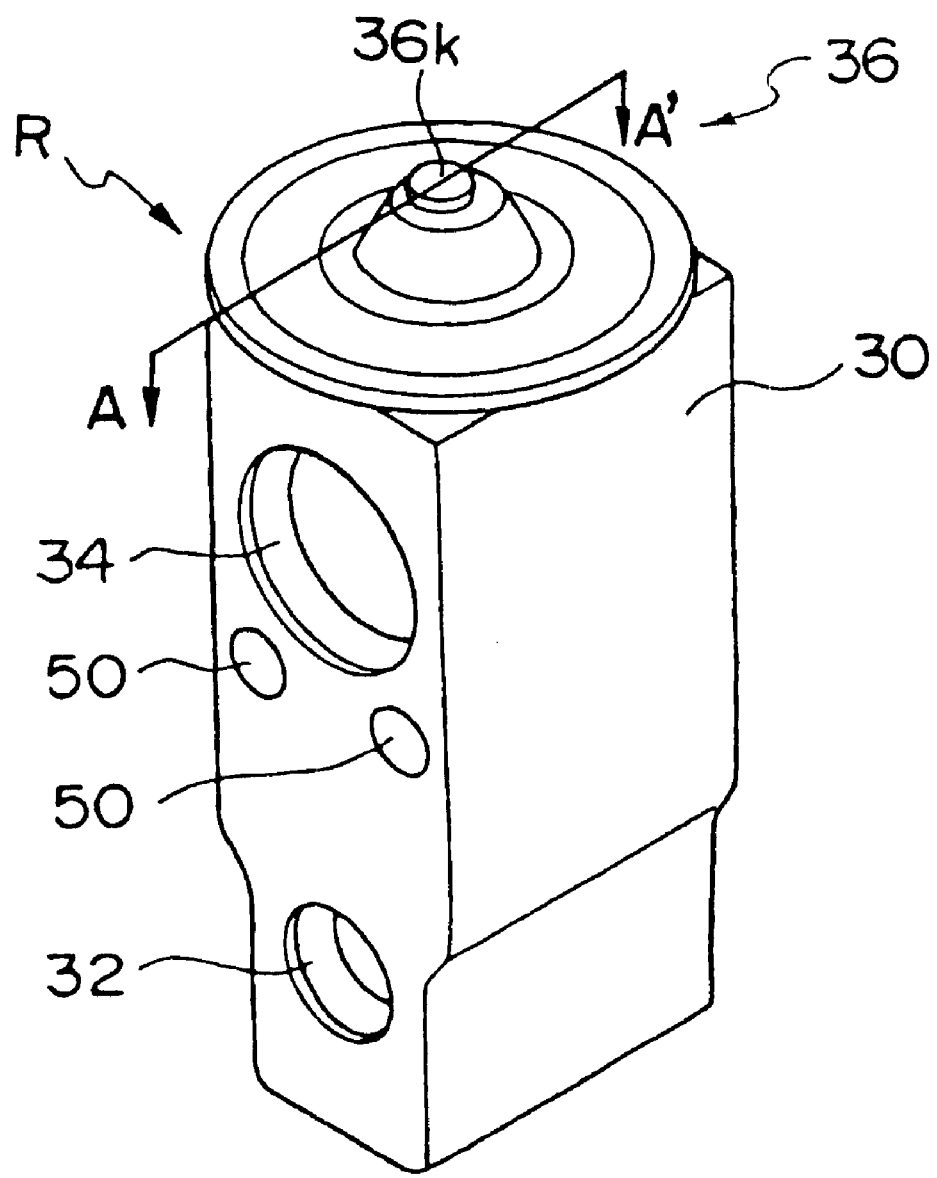
FIG. 9 is a perspective view showing the external appearance of a prior-art expansion valve.
Figure 10:
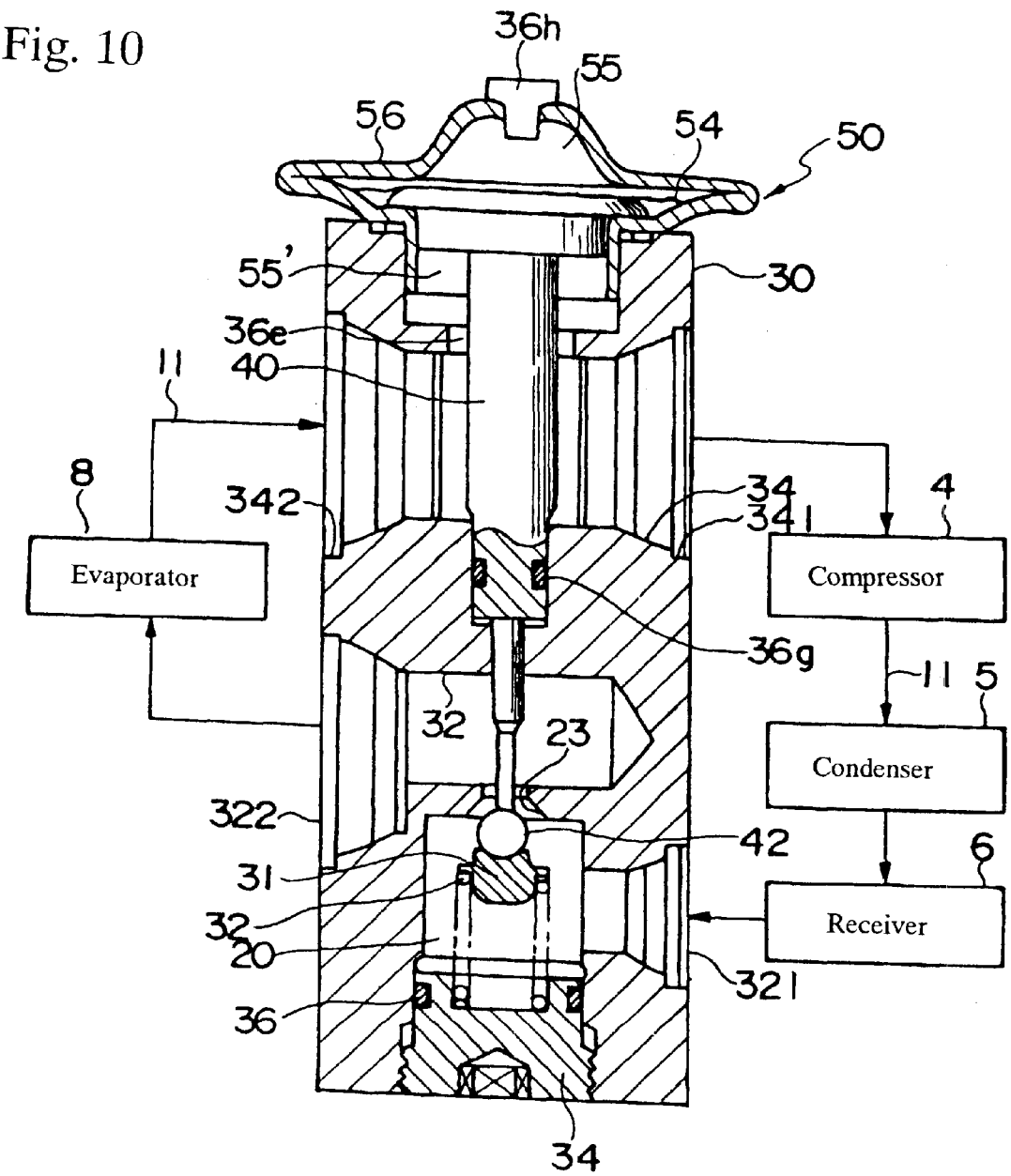
FIG. 10 is a cross-sectional view taken at line A–A' of FIG. 9.

FIG. 1 is a front view of the expansion valve according to the present invention, FIG. 2 is a left side view thereof, FIG. 3 is aright side view thereof, FIG. 4 is aback view thereof, FIG. 5 is an upper view thereof, FIG. 6 is a bottom view thereof, FIG. 7 is a cross-sectional view taken at line A—A of FIG. 1, and FIG. 8 is a cross-sectional view taken at line B—B of FIG. 3. The expansion valve according to the present invention has the same basic structure and performs the same function as the conventional expansion valve shown in FIGS. 9 and 10, so the same parts are provided with the same reference numbers and the explanations thereof are omitted.

The expansion valve shown as a whole by reference number 1 has a prism-shaped body 10 made of aluminum alloy and the like.

The body 10 has four rectangular side surfaces 10a, 10b, 10c, and 10d. The first side surface 10a is provided with openings for a refrigerant passage 24 that sends refrigerant toward an evaporator and a refrigerant passage 26 for refrigerant returning from the evaporator, and two penetrating holes 14.

No opening is formed to the second side surface 10b. The third side surface 10c is provided with openings for an induction passage 22 through which refrigerant supplied from a compressor travels and a passage 28 through which refrigerant returning to the compressor travels.

Further mounted to the third side surface 10c is a stud bolt 12 used for fixing. Close to the stud bold 12 is formed a hole 16 with a bottom.

The fourth side surface 10d is provided with two penetrating holes used for fixing.

According to the cross-sectional views of FIGS. 7 and 8, the passage 22 through which the refrigerant is introduced communicates to a valve chamber 20. A valve hole 23 is formed between the valve chamber 20 and the passage 24 that sends the refrigerant toward the evaporator, the entrance of which functions as a valve seat. The passage 22 and the passage 24 are formed so that respective axial lines cross each other at an angle of 90 degrees. A ball-shaped valve means 42 is supported via a valve support member 31 by a spring 32 inside the valve chamber 20, and the other end of the spring 32 is supported by a plug 34 that seals the valve chamber 20. A sealing member 36 is fit to the plug 34.

The ball-shaped valve means 42 is pressurized by the operating shaft 40 to change the area of flow passage formed between the valve seat 23, thereby controlling the flow rate of the refrigerant provided toward the evaporator.

The other end of the operating shaft 40 is connected to a power element shown as a whole by reference number 50. The power element 50 comprises a diaphragm 54 sandwiched within a case 56, and the diaphragm 54 together with the case 56 defines an upper pressure chamber 55. A heat-sensing gas is filled within the pressure chamber 55 and sealed by a plug body 58. The power element 50 is mounted at a biased position against the valve body 10, which effectively prevents interference between the stud bolt 12 and the penetrating hole 14. Therefore, the wall of the valve body 10 where the stud bolt 12 is mounted is thicker.

A stopper 52 is mounted to a lower pressure chamber 55' of the diaphragm 54, which communicates the movement of the diaphragm 54 to the operating shaft 40 connected to the stopper 52. A cover 70 is provided to the power element 50. Further, the operating shaft 40 has a smaller diameter size compared to the operating shaft utilized in the conventional expansion valve shown in FIGS. 9 and 10.

The refrigerant returning from the evaporator flows into a passage 26 provided to the valve body 10. The passage 26 crosses the passage 28 that returns the refrigerant to the compressor at a right angle, and the operating shaft 40 penetrates the passage 28 in the diametral direction. The temperature of the refrigerant traveling through passages 26 and 28 is transmitted to the operating fluid filled in the chamber 55 through the operating shaft 40 and the stopper 52.

The operating fluid within the chamber 55 functions to drive the valve means 42 via the diaphragm 54 corresponding to the change in refrigerant temperature, thereby controlling the flow rate of the refrigerant sent out to the evaporator.

Since the expansion valve 1 has a prism-shaped valve body 10 and four refrigerant passage openings are formed to adjacent (neighboring) orthogonal side surfaces of the body, a great degree of freedom is secured in mounting the expansion valve to an air conditioner of a vehicle and the like where mounting space for the expansion valve is very limited.

As explained, the present invention provides an expansion valve realizing a high degree of freedom in mounting structure, which enables the evaporator and the condenser to be positioned with ease inside the engine room of the vehicle.

We claim:

1. An expansion valve body, comprising:

a prism-shaped valve body member extending along a centrally-disposed longitudinal axis and having a first wall and an opposite second wall, the first and second walls extending longitudinally and laterally, a third wall and an opposite fourth wall, the third and fourth walls extending longitudinally and transversely and connected perpendicularly at respective longitudinal edges to the first and second walls to define in cross-section a rectangular configuration and a pair of opposite end walls extending laterally and transversely and connected at respective lateral and transverse edges to the first, second, third and fourth walls to define the prism shape, the valve body member including a gas phase refrigerant passage and a liquid phase refrigerant passage extending through and between the first and third walls to form a gas phase refrigerant opening and a liquid phase refrigerant opening in each one of the first and third walls, respective ones of the gas phase refrigerant openings and the liquid phase refrigerant openings being longitudinally disposed apart from one another, a bore extending longitudinally through and between the pair of opposite end walls at a position offset from the centrally-disposed longitudinal axis away from the first wall and closer to the second wall, the bore being in fluid communication with and causing fluid communication between the gas phase refrigerant passage and the liquid phase refrigerant passage and a pair of penetrating holes extending linearly through and between the third and fourth walls with the bore positioned therebetween, the pair of penetrating holes being in fluid isolation from the gas phase refrigerant passage, the liquid phase refrigerant passage and the bore.

2. An expansion valve body according to claim 1, further comprising a threaded hole formed partially into the first wall, disposed in between the gas phase refrigerant opening and the liquid phase refrigerant opening and being in fluid isolation from the gas phase refrigerant passage, the liquid phase refrigerant passage, the bore and the pair of penetrating holes.

3. An expansion valve body according to claim 2, further comprising a threaded shaft sized and adapted to threadably engage the threaded hole wherein, upon threaded engagement, the threaded shaft projects perpendicularly from the first wall.

4. An expansion valve body according to claim 1, wherein the bore is multi-stepped.

* * * * *